(12) United States Patent
Duriez et al.

(10) Patent No.: US 11,167,667 B2
(45) Date of Patent: Nov. 9, 2021

(54) HINGE ASSEMBLY COMPRISING A TILT SENSOR

(71) Applicant: Faurecia Sièges d'Automobile, Nanterre (FR)

(72) Inventors: Didier Duriez, Le Plessis Pate (FR); Rodolphe Babonneau, Longpont sur Orge (FR)

(73) Assignee: FAURECIA SIÈGES D'AUTOMOBILE, Nanterre (FR)

( * ) Notice: Subject to any disclaimer, the term of this patent is extended or adjusted under 35 U.S.C. 154(b) by 229 days.

(21) Appl. No.: 16/421,670

(22) Filed: May 24, 2019

(65) Prior Publication Data
US 2019/0359089 A1 Nov. 28, 2019

(30) Foreign Application Priority Data
May 25, 2018 (FR) ..................... 18 54451

(51) Int. Cl.
*B60N 2/22* (2006.01)
*B60N 2/02* (2006.01)
*G01C 9/06* (2006.01)

(52) U.S. Cl.
CPC ............. *B60N 2/22* (2013.01); *B60N 2/0244* (2013.01); *G01C 9/06* (2013.01); *B60N 2002/0272* (2013.01); *G01C 2009/068* (2013.01)

(58) Field of Classification Search
CPC .......... B60N 2/22; B60N 2/244; B60N 2/235; B60N 2/224; B60N 2/2254; B60N 2/0224
See application file for complete search history.

(56) References Cited

U.S. PATENT DOCUMENTS

| | | | | |
|---|---|---|---|---|
| 3,223,377 A | * | 12/1965 | Bartlett | B60N 2/0248 248/419 |
| 4,278,290 A | | 7/1981 | Werner et al. | |
| 7,116,210 B2 | * | 10/2006 | Lawrence | F02D 11/10 338/116 |
| 8,450,999 B2 | * | 5/2013 | Wolschlager | G01D 21/00 324/207.25 |
| 2018/0370391 A1 | * | 12/2018 | Ketels | B60N 2/2356 |
| 2019/0299814 A1 | * | 10/2019 | Yetukuri | B60N 2/0232 |

FOREIGN PATENT DOCUMENTS

| | | |
|---|---|---|
| DE | 10145746 A1 | 4/2003 |
| DE | 102006039504 A1 | 2/2008 |
| FR | 2431390 A1 | 2/1980 |
| FR | 2815586 A1 | 4/2002 |

OTHER PUBLICATIONS

French Search Report corresponding to French application No. FR 1854451, dated Feb. 7, 2019, 2 pages.
Written Opinion corresponding to French application No. FR 1854451, dated Feb. 7, 2019, 6 pages.

* cited by examiner

*Primary Examiner* — Timothy J Brindley
(74) *Attorney, Agent, or Firm* — Reising Ethington P.C.

(57) ABSTRACT

A hinge assembly for a vehicle seat includes: a first plate and a second plate, mounted rotatable relative to each other about a transverse direction; a hinge arranged between the first plate and the second plate; and a tilt sensor configured to measure an angle formed between the first plate and the second plate about the transverse direction. The tilt sensor is arranged next to the hinge and at least partially between the first plate and the second plate.

8 Claims, 3 Drawing Sheets

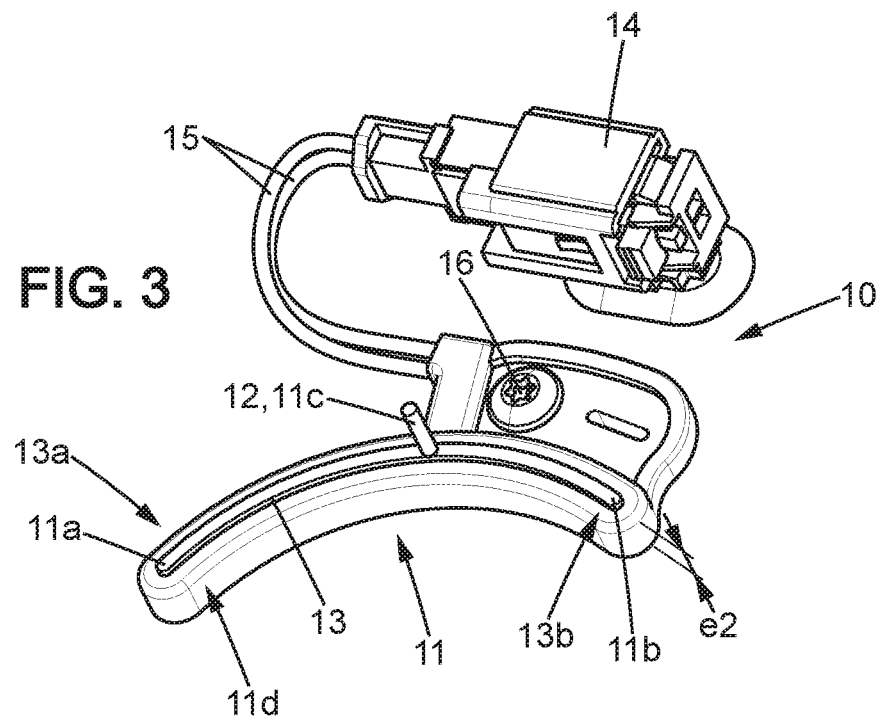
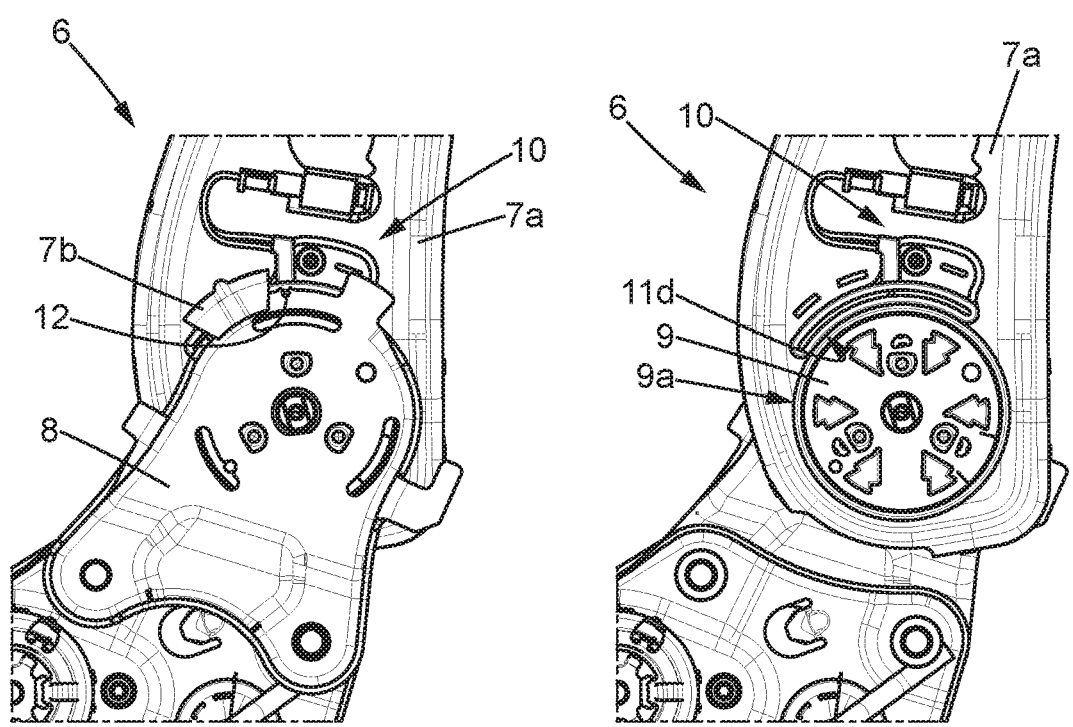

HINGE ASSEMBLY COMPRISING A TILT SENSOR

TECHNICAL FIELD

The present invention relates to a hinge assembly, in particular for a motor vehicle seat, and to a motor vehicle seat comprising such an assembly.

BACKGROUND

In a vehicle seat, the seat backrest is likely to pivot about an axis of rotation relative to the seat. This allows adjusting the comfort of the backrest tilt. This also allows tilting the backrest forward, for example to facilitate access to seating behind the seat.

For this purpose, the seat comprises a hinge assembly arranged between the frame of the backrest and the frame of the seating portion.

In order to measure the tilt of the backrest relative to the seating portion, it is known to arrange two parts in the hinge assembly, mounted rotatable relative to each other about the axis of rotation, one of the parts being fixedly connected to the backrest while the other part is connected to the seating portion. In particular, the part connected to the seating portion is rotationally locked by a locking member extending from the frame of the seating portion. The measurement of the angle between the two parts makes it possible to determine the tilt angle between the backrest and the seating portion.

However, such an assembly has disadvantages.

The two parts and the locking member must be arranged in a specific order, which can be long and tedious to achieve during assembly of the hinge assembly.

In addition, these parts can be bulky and it may be necessary to cover the hinge assembly with an additional covering member in order to prevent them from being visible to the seat user.

SUMMARY

The present invention aims to at least partially solve these disadvantages.

The present invention aims in particular to improve such a hinge assembly, in particular by providing a measurement of the tilt of the backrest relative to the seating portion in a manner that is simple and easy to achieve in a seat hinge assembly.

The invention relates to a hinge assembly for a vehicle seat, comprising:
  a first plate and a second plate, mounted rotatable relative to each other about a transverse direction,
  a hinge arranged between the first plate and the second plate,
  a tilt sensor configured to measure an angle formed between the first plate and the second plate about the transverse direction, the tilt sensor being arranged next to the hinge and at least partially between the first plate and the second plate.

In various embodiments of the invention, one or more of the following arrangements may further be used:
  the tilt sensor has a shape complementary to the shape of the hinge;
  the tilt sensor has a circular arc shape;
  the hinge has a substantially circular shape;
  the tilt sensor comprises a potentiometer;
  the potentiometer comprises a slider configured to be moved in a track between a first end and a second end;
  the potentiometer is fixed to the first plate;
  the slider extends in the transverse direction and is connected to the second plate, the slider being arranged in particular in an opening formed in the second plate; and
  the potentiometer has a thickness less than or equal to the thickness of the hinge in the transverse direction.

Another object of the invention is a vehicle seat comprising a backrest and a seating portion which are interconnected by at least one hinge assembly according to the invention, the first and second plates being respectively fixedly connected to the backrest and to the seating portion.

Of course, the various features, variants, and/or embodiments of the present invention may be associated with each other in various combinations provided that these are not mutually exclusive or incompatible.

BRIEF DESCRIPTION OF THE DRAWINGS

The invention will be better understood and its advantages will be more apparent by reading the following detailed description of an embodiment shown as a non-limiting example. The description refers to the accompanying drawings in which:

FIG. 3 is a perspective view of a tilt sensor according to an embodiment of the invention;

FIGS. 4A and 4B are front views of the hinge assembly of FIG. 2, where the second plate and the stop flange are respectively visible and hidden;

DETAILED DESCRIPTION

For the sake of clarity, only the elements useful to understanding the described embodiment have been represented and will be detailed.

In the description which follows, when reference is made to absolute position qualifiers such as the terms 'front', 'rear', 'top', 'bottom', 'left', 'right', etc., or relative qualifiers such as the terms 'above', 'below', 'upper', 'lower', etc., or to orientation qualifiers, these are in reference to a seat in a normal position of use, in the usual direction of travel of the vehicle.

Hinge Assembly

Figure 1:
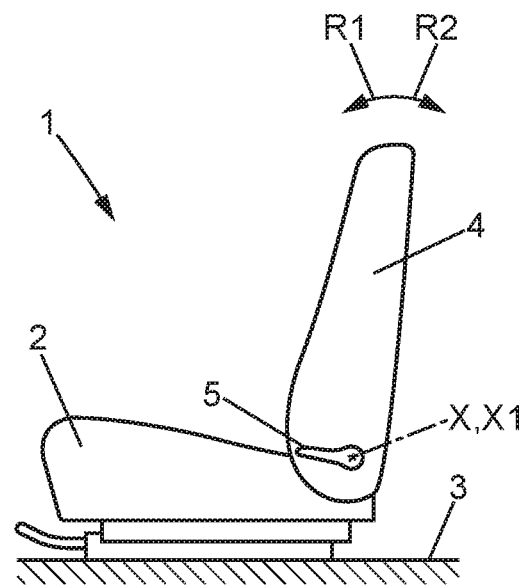
FIG. 1 is a schematic view of a vehicle seat that can be equipped with a hinge assembly according to an embodiment of the invention.

FIG. 1 is a schematic view of a seat 1, in particular a motor vehicle seat 1, comprising at least one seating portion 2, mounted on a fixed structure 3, in particular a floor of the vehicle, and at least one backrest 4.

The backrest 4 is mounted rotatable relative to the seating portion 2 about an axis of rotation X1 in a transverse direction X. The backrest 4 can thus be angled or tilted forward, in a direction R1, or backward, in a direction R2.

The seat 1 may be provided with a handle 5, or with any other control device, enabling a user to adjust the angular position of the backrest 4 by pivoting about the axis of rotation X1.

More particularly, the backrest 4 is mounted rotatable on the seating portion 2 by means of a hinge assembly 6.

Figure 2:
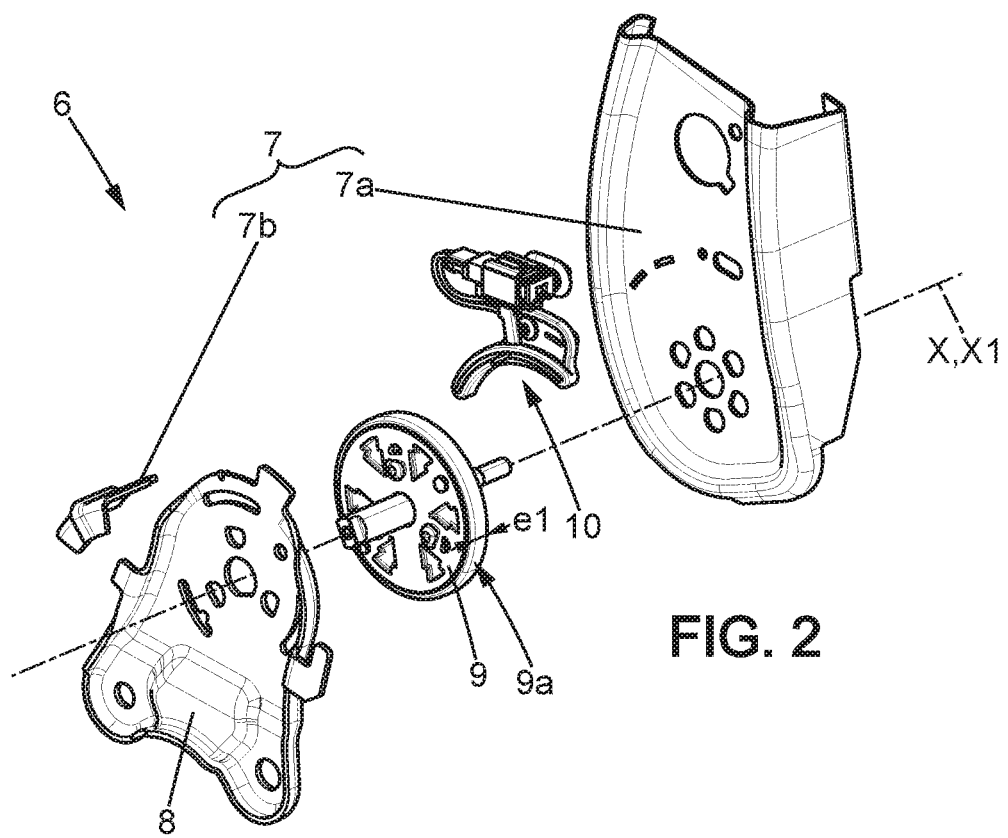
FIG. 2 is an exploded perspective view of the hinge assembly of the seat of FIG. 1.

Reference is now made to FIG. 2, which is a schematic exploded perspective view of such a hinge assembly 6 according to an embodiment of the present invention, suitable for equipping the seat 1 of FIG. 1.

This hinge assembly 6 comprises a first plate 7, a second plate 8, and a hinge 9.

As illustrated in FIG. 2, the first plate 7 is in the form of a sheet-metal plate 7a and, possibly, a stop flange 7b.

The sheet-metal plate 7a extends primarily perpendicularly to the axis of rotation X1. The sheet-metal plate 7a may be part of the frame of the backrest 4, or more generally be connected to the backrest 4.

The stop flange 7b may also be made of sheet metal. The stop flange 7b is welded to the metal plate 7a.

As illustrated in FIG. 2, the second plate 8 is in the form of a sheet-metal plate extending perpendicularly to the axis of rotation X1. The second plate 8 may be part of the frame of the seating portion 2, or more generally may be connected to the seating portion 2.

The hinge 9 is arranged between the first plate 7 and the second plate 8. The hinge 9 is in the form of a metal member which primarily extends perpendicularly to the first axis of rotation X1. The hinge 9 has a substantially circular shape 9a, in particular in a plane perpendicular to the transverse direction X. In addition, the hinge 9 has a thickness e1 in the transverse direction X.

The first plate 7 and the hinge 9 may be interconnected by a locking mechanism (not shown). The locking mechanism is suitable for selectively securing together the first plate 7 and the hinge 9, or for allowing relative pivoting between the first plate 7 and the hinge 9 about the axis of rotation X1.

The hinge 9 and the second plate 8 may also be interconnected by a hinge mechanism (not shown). The hinge mechanism is suitable for allowing a comfort adjustment to the tilt between the first plate 7 and the second plate 8 about the axis of rotation X1.

The hinge assembly 6 also comprises a tilt sensor 10. The tilt sensor 10 is configured to determine a tilt angle between the first plate 7 and the second plate 8, or more generally between the backrest 4 and the seating portion 2.

As illustrated in FIG. 3, the tilt sensor 10 is an electrical sensor. The tilt sensor 10 comprises a potentiometer 11. The potentiometer 11 is a variable resistor with three terminals 11a, 11b, 11c, wherein one of the terminals 11c is connected to a slider 12.

The slider 12 extends in the transverse direction X, and in particular comprises a rod projecting from the potentiometer 11. The slider 12 is configured to be moved continuously in a track or groove 13 extending between a first end 13a and a second end 13b. The three terminals 11a, 11b, 11c of the potentiometer 11 are respectively arranged at the first and second ends 13a, 13b and at the slider 12.

"Continuously" is understood to mean that the slider 12 is not moved to discrete and discontinuous positions between the two ends 13a, 13b of the track 13. Thus it is possible to measure all angles of tilt between a minimum angle and a maximum angle, respectively corresponding to the extreme positions of the slider 12 at the first and second ends 13a, 13b.

As illustrated in FIG. 3, the tilt sensor 10 also comprises an electrical connection means 14, connected to the potentiometer 11 by one or more electrical wires 15.

We now also refer to FIGS. 4A and 4B which are front views of the hinge assembly 6 of FIG. 2, in which the second plate 8 and the stop flange 7b are visible or hidden.

As illustrated in FIG. 4A, the tilt sensor 10, in particular the potentiometer 11, is arranged at least partially, possibly entirely, between the first plate 7 and the second plate 8.

Advantageously, the potentiometer 11 thus has a thickness e2 in the transverse direction X that is less than the distance between the first plate 7 and the second plate 8 within the hinge assembly 6. More particularly, the potentiometer 11 has a thickness e2 that is substantially equal, possibly less than, the thickness e1 of the hinge 9 in the transverse direction X.

The tilt sensor 10 is thus arranged within the hinge assembly 6. It is then not necessary to have a specific covering for hiding the tilt sensor 10 from the user of the seat 1. The tilt sensor 10 can be hidden by the covering used generally to cover the hinge assembly 6.

In addition, such a tilt sensor 10 can easily be adapted to a large number of different seat hinge assemblies.

As illustrated in FIG. 4B, the potentiometer 11 has the shape 11d of a circular arc, advantageously complementary to the shape 9a of the hinge 9. More particularly, the potentiometer 11 has a shape 11d complementary to a portion of the circumference of the hinge 9.

As illustrated in FIG. 4B, the hinge 9 has a substantially circular shape 9a and the potentiometer 11 has the shape 11d of a circular arc that is substantially complementary to the shape 9a of the hinge 9.

More particularly, the potentiometer 11 has a shape 11d which fits closely against the shape 9a of the hinge 9.

The tilt sensor 10, in particular the potentiometer 11, is arranged next to the hinge 9.

"Arranged next to" is understood to mean that the tilt sensor 10, and more particularly the potentiometer 11, is arranged in a plane comprising the hinge 9 and perpendicular to the transverse direction X.

The tilt sensor 10 is fixed to the first plate 7 or to the second plate 8, by screwing, gluing, welding, or other.

Figure 5:
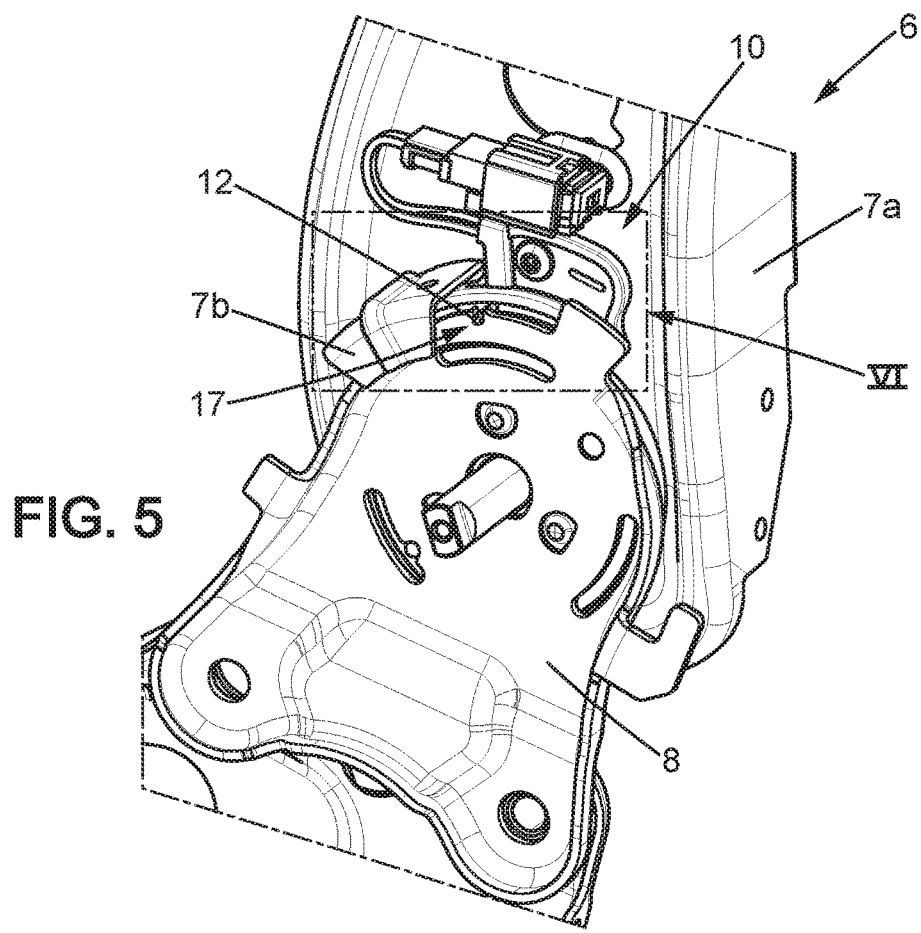
FIG. 5 is a perspective view of the hinge assembly of FIG. 4A.

The potentiometer 11 is advantageously fixed by a single screw 16 to the first plate 7 or to the second plate 8. As illustrated in FIG. 5, the tilt sensor 10 is more particularly fixed to the first plate 7.

In addition, the tilt sensor 10 is advantageously arranged on the outer face of the first plate 7.

"Outer face" is understood to mean the face of the plate facing towards the exterior of the seat 1, in contrast to an inner face which is facing towards the interior of the seat, namely towards the interior of the backrest 4.

It is thus particularly easy to fix the tilt sensor 10 on the first plate 7 before subsequently arranging the hinge 9 and the second plate 8 during assembly of the hinge assembly 6.

In addition, a harness of electrical cables is usually arranged at the outer face of the first plate 7, for example to electrically connect a side airbag of the seat 1 or other elements of the seat 1. This harness can then also be used for electrically connecting the tilt sensor 10.

Figure 6:
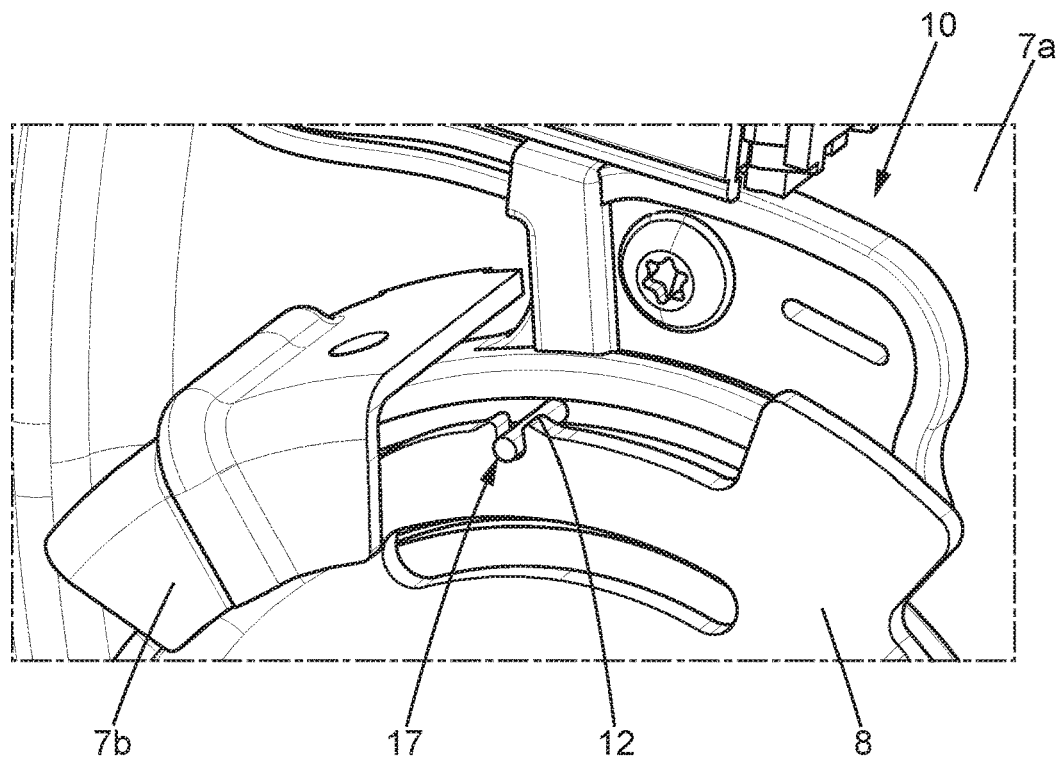
FIG. 6 is an enlarged partial view of FIG. 5.

The second plate 8, on which the tilt sensor 10 is not arranged, comprises an opening 17, advantageously a through-opening, illustrated in FIG. 6. The slider 12 of the potentiometer 10 is arranged within the opening 17. The slider 12 and the opening 17 are fixed to each other when the backrest 4 is moved relative to the seating portion 2.

When the backrest 4 is tilted relative to the seating portion 2, the first plate 7 and the second plate 8 pivot relative to each other about the axis of rotation X1. Since the potentiometer 11 is fixed to the first plate 7, and the slider 12 is fixed to the second plate 8, the slider 12 then moves in the track 13. It is then possible to measure the tilt angle of the backrest 4.

Advantages

As already indicated, the hinge assembly 6 allows obtaining a simple and easily implemented measurement of the tilt angle formed between the first plate 7 and the second plate 8 around the transverse direction X.

In addition, once the backrest 4 is placed in a specific position relative to the seating portion 2, the tilt angle measured in this manner can be stored.

It is then possible to unlock the first plate 7 and the second plate 8 using the locking mechanism. The locking mechanism can be controlled for this purpose by an E-lock type of electrical control device (not shown). The control device can also control the unlocking of the rails of the seat 1, successively or simultaneously.

The seat 1 can then be moved, and the backrest 4 can be pivoted more precisely relative to the seating portion 2, for example to facilitate access for a passenger behind the seat 1 and/or to provide a loading area behind the seat 1.

The backrest 4 can then be repositioned in the previously determined position, for example by once again securing together the first plate 7 and the second plate 8 with the locking mechanism, at the previously stored tilt angle.

This thus provides a system for automatically relocking the backrest 4 at a satisfactory angle adapted to the user.

Of course, the invention is not limited to the embodiment described above and provided solely as an example. It encompasses various modifications, alternative forms, and other variants conceivable to a person skilled in the art within the context of the invention, and in particular any combination of the various modes of operation described above, alone or in combination.

The invention claimed is:

1. A hinge assembly for a vehicle seat, comprising:
   a first plate and a second plate, mounted rotatable relative to each other about a transverse direction,
   a hinge arranged between the first plate and the second plate, and
   a tilt sensor configured to measure an angle formed between the first plate and the second plate about the transverse direction,
   wherein the tilt sensor is arranged next to the hinge and at least partially between the first plate and the second plate, and
   wherein the tilt sensor comprises a potentiometer having a thickness less than or equal to the thickness of the hinge in the transverse direction.

2. The hinge assembly according to claim 1, wherein the tilt sensor has a shape complementary to the shape of the hinge.

3. The hinge assembly according to claim 1, wherein the tilt sensor has a circular arc shape.

4. The hinge assembly according to claim 1, wherein the hinge has a substantially circular shape.

5. The hinge assembly according to claim 1, wherein the potentiometer comprises a slider configured to be moved in a track between a first end and a second end.

6. The hinge assembly according to claim 1, wherein the potentiometer is fixed to the first plate.

7. The hinge assembly according to claim 5, wherein the slider extends in the transverse direction and is connected to the second plate, the slider being arranged in an opening formed in the second plate.

8. A vehicle seat comprising a backrest and a seating portion which are interconnected by at least one hinge assembly according to claim 1, the first and second plates being respectively and fixedly connected to the backrest and to the seating portion.

* * * * *